US012578422B2

(12) United States Patent
Donderici

(10) Patent No.: US 12,578,422 B2
(45) Date of Patent: Mar. 17, 2026

(54) RADAR INTERFERENCE MITIGATION AND ORCHESTRATION BETWEEN VEHICULAR RADAR SENSORS

(71) Applicant: GM Cruise Holdings LLC, San Francisco, CA (US)

(72) Inventor: Burkay Donderici, Burlingame, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 367 days.

(21) Appl. No.: 18/352,674

(22) Filed: Jul. 14, 2023

(65) Prior Publication Data

US 2025/0020761 A1     Jan. 16, 2025

(51) Int. Cl.
*G01S 7/02* (2006.01)
*G01S 13/931* (2020.01)

(52) U.S. Cl.
CPC ............ *G01S 7/023* (2013.01); *G01S 13/931* (2013.01)

(58) Field of Classification Search
CPC ...... G01S 13/931; G01S 7/023; G01S 7/0235; G01S 7/0236; G01S 2013/93271; G01S 2013/93274; G01S 2013/93272
USPC .......................................................... 342/70
See application file for complete search history.

(56) References Cited

U.S. PATENT DOCUMENTS

| | | | | |
|---|---|---|---|---|
| 7,522,092 | B2 * | 4/2009 | Okai .......................... | G01S 7/36 342/159 |
| 9,689,967 | B1 * | 6/2017 | Stark ..................... | G01S 7/0233 |
| 9,846,228 | B2 * | 12/2017 | Davis ..................... | G01S 7/0233 |
| 9,945,943 | B2 * | 4/2018 | Stark ..................... | G01S 7/0233 |
| 10,145,954 | B2 * | 12/2018 | Davis .................. | H04L 27/2278 |
| 10,215,853 | B2 * | 2/2019 | Stark ..................... | H04B 17/345 |
| 10,222,453 | B2 * | 3/2019 | Yomo .................. | G01S 13/867 |
| 10,261,179 | B2 * | 4/2019 | Davis ..................... | G01S 13/87 |
| 11,086,010 | B2 * | 8/2021 | Davis ..................... | G01S 7/023 |
| 11,262,448 | B2 * | 3/2022 | Davis ..................... | G01S 13/87 |
| 11,385,321 | B2 * | 7/2022 | Lin ....................... | G01S 7/0232 |
| 11,614,538 | B2 * | 3/2023 | Davis ..................... | G01S 7/023 342/16 |
| 12,038,523 | B2 * | 7/2024 | Gulati .................... | G01S 7/023 |
| 12,143,318 | B2 * | 11/2024 | Song ..................... | G01S 7/0235 |
| 12,408,068 | B2 * | 9/2025 | Zhang .................. | G01S 7/0236 |
| 2007/0200747 | A1 * | 8/2007 | Okai ..................... | G01S 7/0235 342/159 |
| 2016/0349354 | A1 * | 12/2016 | Yomo .................. | G01S 13/931 |

(Continued)

*Primary Examiner* — Michael W Justice

(74) *Attorney, Agent, or Firm* — CANTOR COLBURN LLP

(57) ABSTRACT

Systems and techniques are provided for mitigating radar interference between radars on a same and/or different vehicles. An example process includes receiving a first signal associated with a first radar sensor; receiving a second signal associated with a second radar sensor; determining an interference between the first signal and the second signal; in response to determining the interference, determining one or more adjustments to an operation of at least one of the first and second radar sensors based on at least one of a safety parameter, a coverage parameter, and a respective context of one or more vehicles associated with at least one of the first and second radar sensors; and transmitting one or more instructions to adjust the operation of at least one of the first and second radar sensors during one or more time intervals.

20 Claims, 7 Drawing Sheets

(56)     References Cited

U.S. PATENT DOCUMENTS

| | | | |
|---|---|---|---|
| 2017/0293027 A1* | 10/2017 | Stark | G01S 13/87 |
| 2018/0100918 A1* | 4/2018 | Davis | G01S 13/931 |
| 2018/0231655 A1* | 8/2018 | Stark | H04B 17/309 |
| 2018/0252809 A1* | 9/2018 | Davis | G01S 7/0233 |
| 2019/0094353 A1* | 3/2019 | Davis | G01S 13/87 |
| 2019/0195985 A1* | 6/2019 | Lin | G01S 7/0233 |
| 2019/0271776 A1* | 9/2019 | Davis | G01S 13/87 |
| 2021/0364634 A1* | 11/2021 | Davis | G01S 7/023 |
| 2022/0095151 A1* | 3/2022 | Zhang | G01S 13/343 |
| 2022/0116162 A1* | 4/2022 | Song | H04W 72/0446 |
| 2022/0308159 A1* | 9/2022 | Gulati | G01S 7/023 |
| 2022/0308160 A1* | 9/2022 | Dent | G01S 7/025 |
| 2022/0350020 A1* | 11/2022 | Davis | G01S 13/32 |
| 2024/0168173 A1* | 5/2024 | Filippi | G01S 7/0236 |
| 2024/0280664 A1* | 8/2024 | Stefanatos | G01S 7/0232 |

* cited by examiner

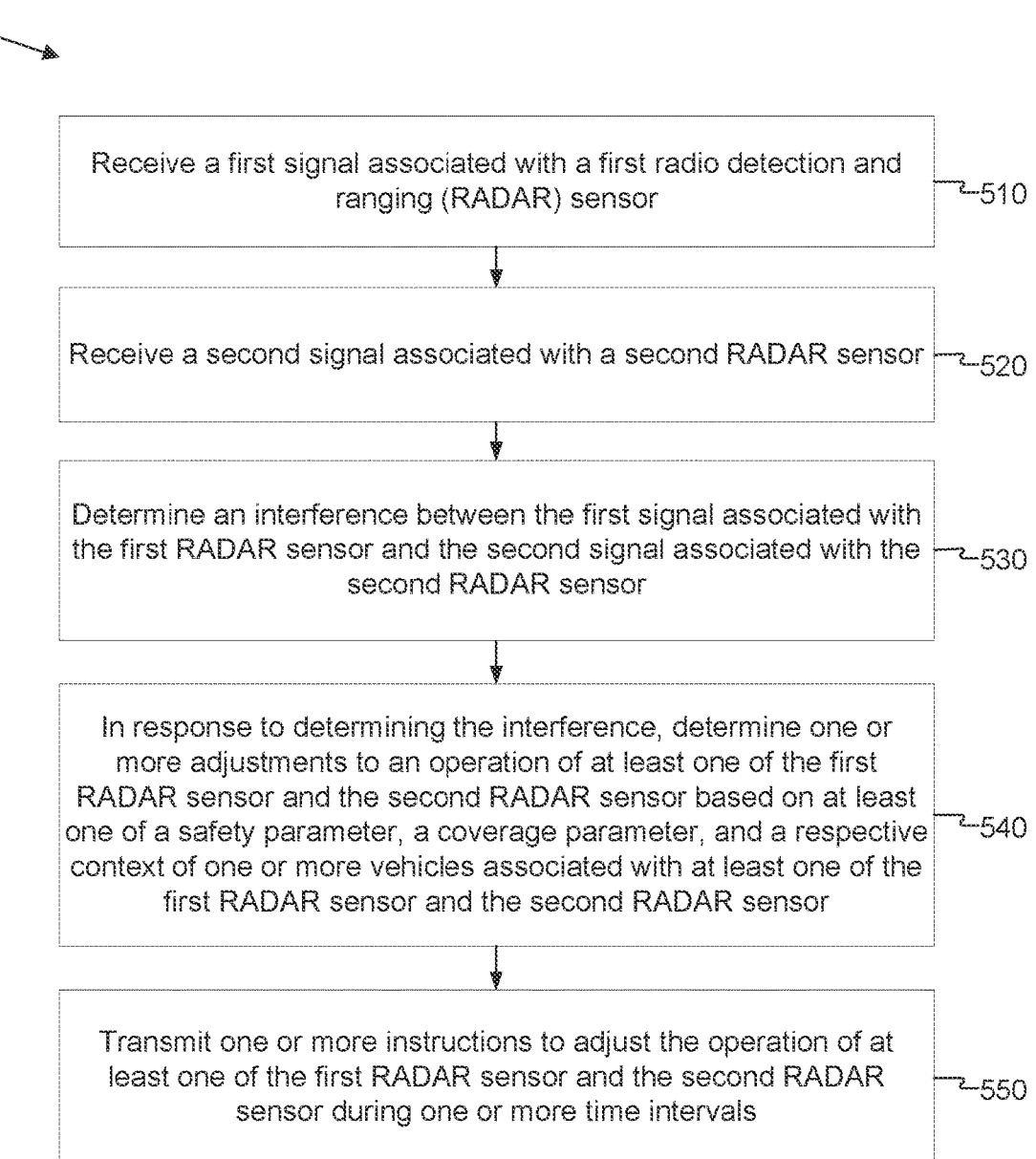

500

Receive a first signal associated with a first radio detection and ranging (RADAR) sensor ⌐ᴸ510

Receive a second signal associated with a second RADAR sensor ⌐ᴸ520

Determine an interference between the first signal associated with the first RADAR sensor and the second signal associated with the second RADAR sensor ⌐ᴸ530

In response to determining the interference, determine one or more adjustments to an operation of at least one of the first RADAR sensor and the second RADAR sensor based on at least one of a safety parameter, a coverage parameter, and a respective context of one or more vehicles associated with at least one of the first RADAR sensor and the second RADAR sensor ⌐ᴸ540

Transmit one or more instructions to adjust the operation of at least one of the first RADAR sensor and the second RADAR sensor during one or more time intervals ⌐ᴸ550

NEURAL NETWORK 608

Hidden Layer
622n

Hidden Layer
622b

Hidden Layer
622a

Input Layer
620

Output Layer
621

RADAR INTERFERENCE MITIGATION AND ORCHESTRATION BETWEEN VEHICULAR RADAR SENSORS

BACKGROUND

1. Technical Field

The present disclosure generally relates to a radio detection and ranging (radar) sensor. For example, aspects of the present disclosure relate to techniques and systems for mitigating radar interference between vehicular radar sensors.

2. Introduction

Sensors are commonly integrated into a wide array of systems and electronic devices such as, for example, camera systems, mobile phones, autonomous systems (e.g., autonomous vehicles, unmanned aerial vehicles or drones, autonomous robots, etc.), computers, smart wearables, and many other devices. The sensors allow users to obtain sensor data that measures, describes, and/or depicts one or more aspects of a target such as an object, a scene, a person, and/or any other targets. For example, an image sensor can be used to capture frames (e.g., video frames and/or still pictures/images) depicting a target(s) from any electronic device equipped with an image sensor. As another example, a light detection and ranging (LiDAR) sensor can be used to determine ranges (variable distance) of one or more targets by directing a laser to a surface of an entity (e.g., a person, an object, a structure, an animal, etc.) and measuring the time for light reflected from the surface to return to the LiDAR.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which:

FIG. 5 is a flowchart illustrating an example process for mitigating radar interference between vehicular radar sensors, according to some examples of the present disclosure;

DETAILED DESCRIPTION

Figure 1:
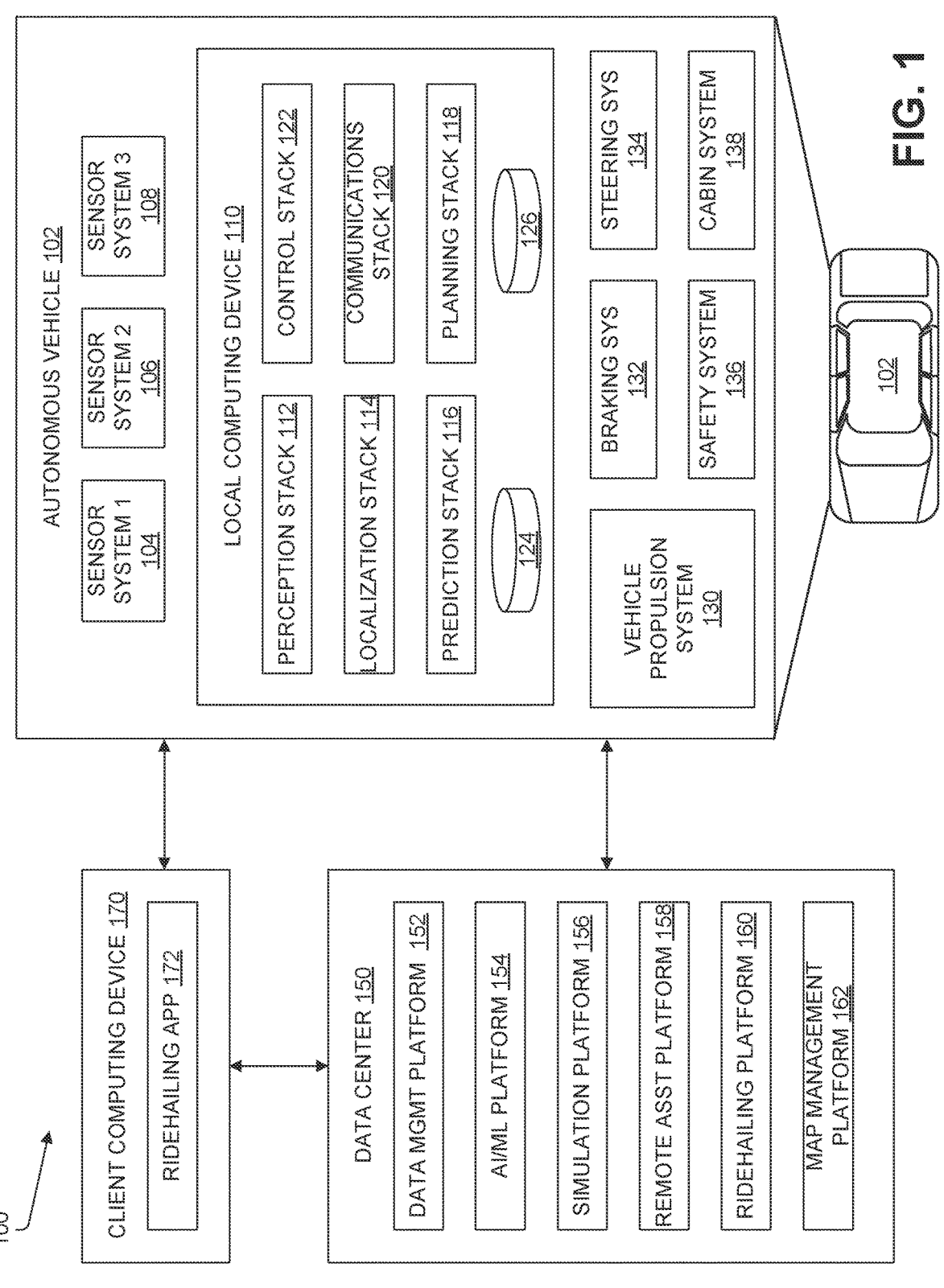
FIG. 1 is a diagram illustrating an example system environment that can be used to facilitate autonomous vehicle (AV) navigation and routing operations, in accordance with some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Some aspect of the present technology may relate to the gathering and use of data available from various sources to improve safety, quality, and experience. The present disclosure contemplates that in some instances, this gathered data may include personal information. The present disclosure contemplates that the entities involved with such personal information respect and value privacy policies and practices.

Generally, sensors are integrated into a wide array of systems and electronic devices such as, for example, camera systems, mobile phones, autonomous systems (e.g., autonomous vehicles, unmanned aerial vehicles or drones, autonomous robots, etc.), computers, smart wearables, and many other devices. The sensors allow users to obtain sensor data that measures, describes, and/or depicts one or more aspects of a target such as an object, a scene, a person, and/or any other targets. For example, an image sensor can be used to capture frames (e.g., video frames and/or still pictures/images) depicting a target(s) from any electronic device equipped with an image sensor. As another example, a light detection and ranging (LiDAR) sensor can be used to determine ranges (variable distance) of one or more targets by directing a laser to a surface of an entity (e.g., a person, an object, a structure, an animal, etc.) and measuring the time of flight (e.g., time to receive reflection corresponding to LiDAR transmission). As another example, a RADAR sensor can be used to identify objects and measure range (e.g., distance) to an object as well as to determine movement of an object.

A radar (also referred to as a radio detection and ranging (RADAR) sensor or a radar sensor) is a detection device that relies on sending and receiving electromagnetic waves to measure, detect, and locate objects in the environment such as vehicles, buildings, pedestrians, and so on. For example, a radar signal from a transmitter reflects off the objects and returns to a receiver, providing information about the objects such as object shape, size, range, angle, distance, position, and/or velocity. Various radar sensors with different functions can be placed on a vehicle (e.g., an autonomous vehicle) to provide 360° coverage around the vehicle.

Radar sensors may often use the same allocated frequency spectrum. Consequently, multiple radar sensors may transmit at an overlapping time and frequency and interfere with each other. The radar interference may elevate a noise floor during signal processing and result in less reliable results, such as less reliable object detection, object tracking, etc. As the number of radar sensors on a vehicle increases and/or more vehicles on the roads are equipped with radar sensors, radar interference between radar sensors on a same and/or different vehicles is increasingly challenging. In some cases, radar interference can be mitigated using signal processing or time/frequency division multiplexing.

Systems, apparatuses, processes (also referred to as methods), and computer-readable media (collectively referred to as "systems and techniques" or "system") are described herein for mitigating or eliminating interference between radars. In some aspects, the systems and techniques described herein can be used to mitigate or reduce interference between radars on a same and/or different vehicles (e.g., radars mounted on one or more vehicles). For example, the systems and techniques described herein can mitigate or eliminate radar interference between radar sensors on one or more vehicles based on one or more factors such as a safety parameter, a coverage parameter, a priority parameter, and/or a respective context of one or more vehicles with radar sensors associated with the radar interference. In some aspects, the radar interference can be from radars on different vehicles (e.g., vehicle-to-vehicle radar interference) or within a single vehicle (e.g., intra-vehicle radar interference). In other aspects, the radar interference can be from radars on other systems or objects, such as other types of autonomous systems, robotic systems, electronic devices, etc. For illustration and explanation purposes, the radar interference will be described herein with respect to radars on one or more vehicles.

In some cases, the systems and techniques can determine time intervals (or a period of time) for which any adjustment of the operation of radars should be performed in order to avoid or mitigate interference between one or more radars. For example, the systems and techniques can determine one or more adjustments to an operation of a radar sensor(s) to be made during one or more time intervals to avoid interference between signals from the radar(s) and a different radar(s). The time-limited/defined adjustment can improve the resource utilization of radars, mitigate or prevent radar interference, and facilitate fairness if radar sensors belong to different operators without negatively impacting (or with a minimal and/or controlled impact) any operations that use and/or rely on radar sensor data.

Upon detection of radar interference, the systems and techniques may transmit a signal to adjust an operation of at least one of the radar sensors that might be causing or involved in the radar interference. For example, the systems and techniques can activate one of the radar sensors (or deactivate one of the radar sensors), change a power level of one or both of the radar sensors, or adjust a beamforming parameter of one or both of the radar sensors to mitigate or prevent radar interference between the radar sensors.

In some examples, radar data from one or more radar sensors experiencing radar interference can be processed by a machine learning model to help coordinate or schedule use and/or operation of associated radar sensors. For example, a machine learning model can process the radar data to assess or predict the safety contribution of each radar sensor. The systems and techniques described herein can use the safety contribution of each radar sensor to intelligently adjust (or schedule/coordinate an adjustment of) an operation of one or more radar sensors (e.g., turn off a radar sensor during an operation of another radar sensor, reduce a power level of one or more radar sensors, adjust a beamforming parameter of one or more radar sensors, etc.) in a manner that prioritizes and/or accounts for any safety effects/considerations of such adjustment. In another example, a machine learning model can process the radar data to assess or predict the impact of interference for each combination of radar sensors. Such assessments or predictions from machine learning model(s) can be used to determine an adjustment of an operation of one or both of the radar sensors to mitigate or prevent radar interference.

Various examples of the systems and techniques described herein for mitigating radar interference between vehicular radar sensors are illustrated in FIG. 1 through FIG. 7 and described below.

FIG. 1 is a diagram illustrating an example autonomous vehicle (AV) environment 100, according to some examples of the present disclosure. One of ordinary skill in the art will understand that, for AV environment 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV environment 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a localization stack 114, a prediction stack 116, a planning stack 118, a communications stack 120, a control stack 122, an AV operational database 124, and an HD geospatial database 126, among other stacks and systems.

Perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the perception stack 112 can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

Prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

Planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

Control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

Communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Low Power Wide Area Network (LPWAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

Data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ride-hailing service (e.g., a ridesharing service), a delivery service, a remote/roadside assistance service, street services (e.g., street mapping, street patrol, street cleaning, street metering, parking reservation, etc.), and the like.

Data center 150 can send and receive various signals to and from the AV 102 and the client computing device 170.

These signals can include sensor data captured by the sensor systems 104-108, roadside assistance requests, software updates, ride-hailing/ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ride-hailing platform 160, and a map management platform 162, among other systems.

Data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ride-hailing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ride-hailing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

Simulation platform 156 can enable testing and validation of the algorithms, machine learning models, neural networks, and other development efforts for the AV 102, the remote assistance platform 158, the ride-hailing platform 160, the map management platform 162, and other platforms and systems. Simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

Remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

Ride-hailing platform 160 can interact with a customer of a ride-hailing service via a ride-hailing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ride-hailing application 172. The client computing device 170 can be a customer's mobile computing device or a computing device integrated with the AV 102 (e.g., the local computing device 110). The ride-hailing platform 160 can receive requests to pick up or drop off from the ride-hailing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ride-hailing platform 160 may incorporate the map viewing services into the ride-hailing application 172 (e.g., client application) to enable passengers to view the AV 102 in transit en route to a pick-up or drop-off location, and so on.

While the AV 102, the local computing device 110, and the AV environment 100 are shown to include certain systems and components, one of ordinary skill will appreciate that the AV 102, the local computing device 110, and/or the AV environment 100 can include more or fewer systems and/or components than those shown in FIG. 1. For example, the AV 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

Figure 2:
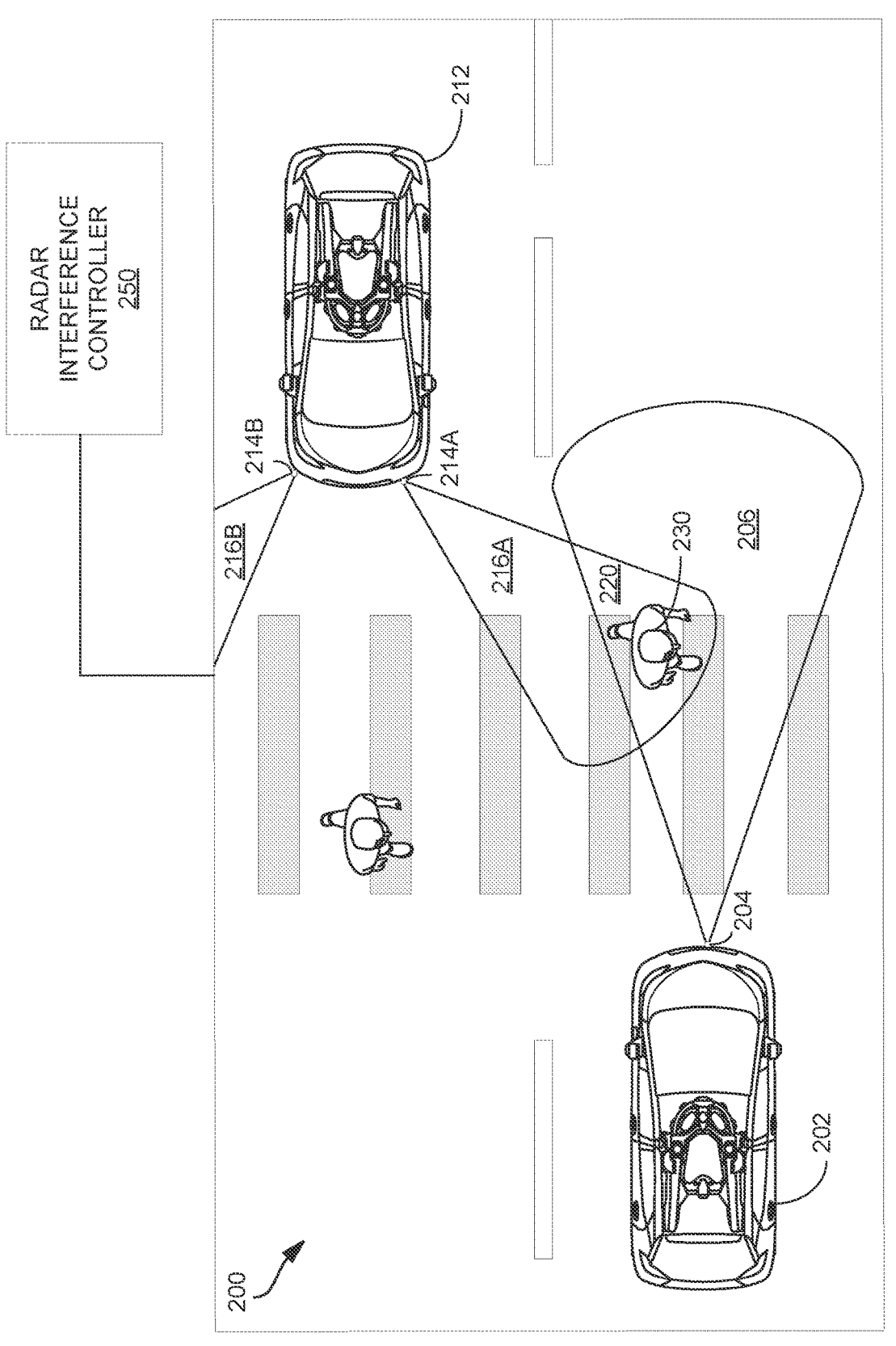
FIG. 2 illustrates a diagram illustrating an example environment in which vehicle-to-vehicle radar interference can be mitigated, according to some examples of the present disclosure.

FIG. 2 illustrates an example environment 200 in which vehicle-to-vehicle radar interference can be mitigated or prevented via radar interference controller 250. In the example environment 200, first vehicle 202 and second vehicle 212 are in proximity to each other (e.g., within a proximity such that signals from radar sensor on first vehicle 202 and second vehicle 212 may interfere with each other) and a pedestrian 230 is crossing a cross-street, which is located between first vehicle 202 and second vehicle 212. As shown, first vehicle 202 has a front radar 204 that has a coverage 206. A coverage (e.g., coverage 206, coverage 216A and 216B, etc.) can be defined as an area of space where there is sufficient radar signal projected and received for the radar application. For example, coverage may be 0 to 270 degrees in azimuth, and −45 to 45 degrees in elevation. Also, second vehicle 212 has corner radars 214A and 214B that have coverage 216A and 216B, respectively. As FIG. 2 indicates, front radar 204 and corner radar 214A have an overlapping coverage 220 at one or more periods of time given their respective poses and coverages (e.g., field-of-views (FOVs) within the environment 200 at the one or more periods of time. The overlapping coverage 220 in this example includes a portion of a scene and pedestrian 230.

In some approaches, radar interference controller 250 can obtain information from vehicles in the scene (e.g., first vehicle 202, second vehicle 212, etc.) such as a state of the vehicles, radar information, a plan or planned path of the vehicles, a context of the vehicles, etc. The radar interference controller 250 can communicate with the vehicles (e.g., first vehicle 202 and second vehicle 212) to identify interference and orchestrate/coordinate/schedule operation and/or adjustments of associated radar sensors (e.g., front radar 204 and/or corner radar 214A). In this example of FIG. 2, radar interference controller 250 makes decisions, identifications, orchestration/scheduling/coordination, but in other examples, a computer or computing device of a vehicle can make such decisions and actions.

In some examples, radar interference controller 250 can identify radar interference between front radar 204 of first vehicle 202 and corner radar 214A of second vehicle 212. For example, radar interference controller 250 can determine the radar interference based on the collective radar information from front radar 204 and corner radar 214A and/or the overlapping coverage 220 of front radar 204 and corner radar 214A. The radar information can include radar data and/or signals captured by front radar 204 and corner radar 214A, radar data and/or signals from various radars mounted on first vehicle 202 and/or second vehicle 212, and/or sensor data and/or signals collected by various sensors mounted on first vehicle 202 and second vehicle 212.

In some approaches, the radar interference can be identified based on one or more artifacts in radar data. The one or more artifacts can represent radar interference and noise resulting from the radar interference. For example, the interference caused by returns from corner radar 214A can make radar data captured by front radar 204 mistakenly/incorrectly indicate that there is another pedestrian and/or object within the overlapping coverage 206 in addition to pedestrian 230, can make the radar data from front radar 204 indicate a position and/or shape of pedestrian 230 that conflicts with the position and/or shape of pedestrian 230 indicated by the radar data from corner radar 214A, and/or can make any of the radar data indicate any other distortions, inaccuracies, artifacts, etc.

In some cases, the presence of radar interference can be detected from abnormalities in detected objects. For example, a number of detections may be unusually high within a small area or small angular spacing (e.g., above a threshold number of detections within a predetermined size of an area or angular spacing). In some examples, the location of a source/cause of the radar interference may be detected from the direction of the abnormal detections. The type of a source/cause of the radar interference may be detected based on interference patterns. For example, depending on the operation principle of the interfering radar, the artifacts may take a shape of blobs, rings, or lines in a top-down map view. In some examples, if a type of the source/cause of the radar interference is determined, other characteristics of the source/cause of the radar interference can be inferred. For example, based on the orientation of the interfering vehicle, a particular radar on the vehicle that is most likely causing the radar interference can be determined.

In order to determine how to prevent or mitigate the radar interference between front radar 204 and corner radar 214A in this example, radar interference controller 250 can assess various factors that can be used to identify a relevance (of radar data, radars, radar operations, etc.), priority, and/or need of radar data (and/or associated radars such as front radar 204 and/or corner radar 214A) to vehicles in the scene (e.g., first vehicle 202 and/or second vehicle 212). Non-limiting examples of the factors that may be assessed can include a safety parameter associated with first vehicle 202 and/or second vehicle 212 (and/or associated radar sensors), a coverage parameter associated with first vehicle 202 and/or second vehicle 212 (and/or associated radar sensors), a priority parameter, a need or usage parameter, and/or a respective context of first vehicle 202 and/or second vehicle 212.

In some examples, radar interference controller 250 can use the information about the scene from various sensors mounted on first vehicle 202 and/or second vehicle 212 to assess the above-described various factors and determine which radar(s) or what portions of the scene may be relevant to one or more vehicles (and/or one or more operations and/or contexts of the one or more vehicles), what radar data and coverage is needed by a vehicle at a particular period of time(s), what radar data and coverage is not needed by a vehicle (and/or the vehicle can forego without a threshold impact on an operation of the vehicle, a safety parameter of the vehicle, a performance of the vehicle, an action of the vehicle, a constraint of the vehicle, a parameter of the vehicle, etc.) at a particular period of time(s), a priority and/or need of certain radar data and/or associated coverage for a vehicle at a particular period of time(s), a criticality of a radar and/or associated radar data to a vehicle at a particular period of time(s), etc.

For example, radar data captured by front radar 204 can be compared with sensor data captured by other sensors (e.g., a camera sensor, a LIDAR sensor, a radar sensor, an ultrasonic sensor, an infrared sensor, a GPS, an IMU, etc.) to determine whether there is interference between front radar 204 and another radar (e.g., corner radar 214A), whether adjusting an operation of front radar 204 can mitigate or eliminate such interference, whether vehicle 202 needs data (and/or determine a priority of such data) from front radar 204 (e.g., and thus needs to maintain front radar 204 in use) given a context of vehicle 202, whether the operation of front radar 204 can be adjusted or turned on/off to mitigate or eliminate an interference between front radar 204 and another radar (e.g., corner radar 214A) without a threshold impact on vehicle 202 (e.g., without a threshold impact on an operation of vehicle 202, a safety parameter of vehicle 202, a performance of vehicle 202, an action of vehicle 202, a constraint of vehicle 202, a parameter of vehicle 202, etc.), and/or how an operation of front radar 204 can be adjusted to mitigate or eliminate the interference without having a threshold impact on vehicle 202.

In some examples, radar interference controller 250 can assess and predict the impact of radar data on first vehicle 202 (or coverage 206 covered by front radar 204), second vehicle 212 (or coverage 216A covered by corner radar 214A), or any other entity that may present in the scene (e.g., pedestrian 230). The impact assessed and/or predicted can relate to a safety of a vehicle (e.g., a safety of an operation of a vehicle) if the vehicle does not receive the radar data during a period of time (or receives less radar data), a performance of the vehicle if the vehicle does not receive the radar data during a period of time, an ability of the vehicle to perform a planned action/operation if the vehicle does not receive the radar data during a period of time, an accuracy of perception determinations by the vehicle if the vehicle does not receive the radar data during a period of time, etc. In some aspects, radar interference controller 250 can evaluate the need for radar data from each radar (e.g., front radar 204 and corner radar 214A) to safely operate (e.g., to maintain at least a threshold safety metric) in the scene.

For example, if first vehicle 202 is driving forward and does not have information (or has incorrect information) about a relevant area (e.g., relevant to first vehicle 202) in the scene including coverage 206 (e.g., whether pedestrian 230 within coverage 206 exists or not, the location of pedestrian 230, whether there are other pedestrians or objects within the scene area including coverage 206, etc.), the lack of information about that scene area (and/or the incorrect information about that scene area) associated with coverage 206 can cause a certain safety risk such as a risk of a collision with pedestrian 230. If second vehicle 212 is driving forward and does not have information (or has incorrect information) about the scene area associated with coverage 216A (e.g., whether pedestrian 230 exists or not within coverage 216A, etc.), the lack of information about that scene area (and/or the incorrect information about that scene area) associated with coverage 216A may have a lower safety risk than in the previous example regarding first vehicle 202 and coverage 206 because most of coverage 216A is outside of a path of second vehicle 212, though there is still some safety risk as a pedestrian or object within coverage 216A moving towards a path of second vehicle 212 could potentially reach the path of second vehicle 212 before second vehicle 212 or at a same time as second vehicle 212, which could cause a collision.

As follows, radar interference controller 250 can determine the safety score (or a degree of safety) for front radar 204 and/or corner radar 214A (and/or associated radar data) and/or portions of the scene covered by front radar 204 and/or corner radar 214A. The safety score can relate to and/or measure a safety of an operation of first vehicle 202 and second vehicle 212 during one or more periods of time if the first vehicle 202 and/or the second vehicle 212 does/do or does/do not receive radar data from front radar 204 and/or corner radar 214A during the one or more periods of time. For example, the impact on a safety of an operation of one or more vehicles in a scene can be evaluated in terms of a safety score or a metric that represents the impact on safety of the information from a particular radar or about a particular scene area covered by a radar to determine which radar(s) would need to be adjusted or turned on/off because the lack of data from such radar(s) being turned off would not have an impact (or would have a minimal or acceptable impact) on a safety metric for one or more vehicles in a scene.

To illustrate, if front radar 204 (and/or an area covered by front radar 204) has a higher safety score than corner radar 214A (or an area covered by corner radar 214A) in a particular context, radar interference controller 250 can turn on or keep front radar 204 with the higher safety score to gather data about the scene since front radar 204 and its radar information will have a greater impact on the safety. In this example, the safety score associated with front radar 204 (and/or an area covered by front radar 204) can trigger a determination that front radar 204 should be on to gather radar data in that particular context in order to prevent the safety score from dropping to a level (e.g., below a threshold) that could cause a safety risk (or a threshold safety risk). On the other hand, if corner radar 214A does not increase a safety score (or does not provide a threshold increase) in the particular context, the corner radar 214A may be turned off (or adjusted to implement a lower power level and/or a particular beamformer parameter) during a period of time associated with the context to avoid or reduce radar interference that could be caused or exacerbated by corner radar 214A. For example, the impact of corner radar 214A (and/or radar data from corner radar 214A) on a safety score associated with second vehicle 212 (e.g., which can impact first vehicle 202 and/or pedestrian 230) during a period of time associated with the particular context may be negligible or below a threshold, which can indicate that second vehicle 212 can operate for that period of time without data from corner radar 214A and without reducing a safety metric associated with second vehicle 212 below a threshold or to an unacceptable level (e.g., second vehicle 212 can operate safely without data from corner radar 214A for that period of time).

In some approaches, radar interference controller 250 can assess and predict the coverage of front radar 204 and corner radar 214A (e.g., a coverage parameter) and an impact of data from front radar 204 and corner radar 214A on an AV metric (e.g., a safety metric, a performance metric, an operational metric, etc.) to determine any measures that can be taken to mitigate the radar interference, such as turning off one or more radars for a period of time, reducing a power level of one or more radars for a period of time, modifying a beamforming parameter of one or more radars for a period of time, modifying a coverage of one or more radars for a period of time, and/or otherwise adjusting an operation of one or more radars for a period of time to reduce or eliminate associated radar interference.

For example, if front radar 204 on first vehicle 202 and corner radar 214A on second vehicle 212 have overlapping coverage 220 as shown in FIG. 2 (e.g., front radar 204 and corner radar 214A sense an overlapping portion of the scene or have a threshold overlap), radar interference controller 250 can select one radar (e.g., front radar 204) to run for a period of time and deactivate the other radar (e.g., corner radar 214A) for that period of time to reduce or avoid radar interference between front radar 204 and corner radar 214A. The decision to run one radar and turn off the other radar can be based on an impact of the data from the radar turned or left on for the period of time and the impact of the data of the other radar turned off for the period of time.

The impact can be based on and/or determined based on one or more parameters calculated for the radar turned/left on and the radar turned off, such as a safety metric associated with running and/or turning off each of the radars. To illustrate, if the data from one radar (e.g., during a period of time, in a given context, etc.) is determined to impact a parameter of a vehicle (e.g., a safety metric, a performance metric, etc.) or if not having the data from that radar (e.g., during the period of time, in the given context, etc.) has a threshold impact on the parameter of that vehicle, the radar can be turned on or maintained on (e.g., during the period of time, in the given context, etc.) to receive data from that radar and avoid a safety risk associated with turning that radar off. On the other hand, if the data from another radar (e.g., during a period of time, in a given context, etc.) that may cause or exacerbate a radio interference with the radar in the previous example is determined to not provide a threshold impact on a parameter of a vehicle (e.g., a safety metric, a performance metric, etc.) or if not having the data from that other radar (e.g., during the period of time, in the given context, etc.) does not have a threshold impact on the parameter of that vehicle, the other radar can be turned off or otherwise adjusted (e.g., during the period of time, in the given context, etc.) without causing or increasing a safety risk associated with a vehicle.

In some cases, when one of the radars (e.g., corner radar 214A) is deactivated, radar interference controller 250 can collect and share the data from the other radar (e.g., front radar 204) to second vehicle 212 (e.g., which has corner radar 214A deactivated and is thus not receiving data from corner radar 214A) so that both first vehicle 202 and second vehicle 212 have coverage for the area covered by the other radar (e.g., front radar 204), including the area within overlapping coverage 220, despite one radar (corner radar 214A) being off at least during the time the radar was turned off. For example, when corner radar 214A is adjusted or turned off and does not provide coverage 216A, radar data collected by front radar 204 of first vehicle 202 can be shared with second vehicle 212 to provide second vehicle 212 with at least a portion of coverage 216A such as overlapping coverage 220.

In some aspects, radar interference controller 250 can transform radar data from first vehicle 202 having a perspective associated with first vehicle 202 (e.g., relative to first vehicle 202) to appear from the perspective of second vehicle 212 so that second vehicle 212 can have at least some information about a region covered by that radar data, which may have been otherwise covered by corner radar 214A. For example, radar data from front radar 204 of first vehicle 202 has a perspective based on the location and position/motion of first vehicle 202 (and the pose of front radar 204 on first vehicle 202) relative to the scene. As follows, radar interference controller 250 can determine the difference(s) of the locations and positions/motions of first vehicle 202 and second vehicle 212 as well as the poses of front radar 204 on first vehicle 202 when radar data is captured by front radar 204, and apply a transformation to the radar data from front radar 204 so that the radar data appears as if it was captured from second vehicle 212 (e.g., from a perspective and/or coordinate system of second vehicle 212). In some cases, radar interference controller 250 can take into account the poses and trajectories of first vehicle 202 and second vehicle 212 and determine the difference(s) in the poses and trajectories to project the radar data captured from first vehicle 202 to appear as if it was captured from second vehicle 212.

In some examples, the transform can be implemented by an algorithm, such as a machine learning algorithm. In some cases, the transform can be implemented by a generative model, such as a generative adversarial network (GAN), that can generate, modify, or recreate one or more portions of a scene from a perspective of second vehicle 212 and/or modify the radar data transformed to the perspective of second vehicle 212 to include radar data capturing and/or depicting (or modify radar data to appear as if it captured or depicts) a region of the scene from a perspective of second vehicle 212, which may differ from how such radar data may appear from the perspective of first vehicle 202.

As follows, radar interference controller 250 can enable sharing of data between different vehicles without having to activate multiple radars to obtain data for the same region of the scene. For example, if a radar from first vehicle 202 is turned off for a period of time, first vehicle 202 can receive data from a radar on second vehicle 212 which may provide some coverage that would otherwise be provided by the radar on first vehicle 202 that is/was turned off. The sharing can be determined based on the state of radars, the coverage of radars, the context of associated vehicles, etc. To illustrate, a determination of what or when to share data from a radar on a vehicle with another vehicle that has another radar turned off (e.g., to reduce interference with the radar on the vehicle that has its radar turned on) can be based on one or more factors such as, for example, which radars are turned off or on during a period of time, the coverage of radars that are left or turned on and the radars that are left or turned off, a vehicle's need for radar data associated with a region covered by the radar that is off during the period of time and/or the radar that is on during the period of time, an impact on a parameter (e.g., a safety metric, a performance metric, a scene understanding metric, etc.) of a vehicle from having the radar turned off for the period of time, etc.

In some aspects, radar interference controller 250 can fuse data from multiple sensors to obtain a wider or full coverage despite corner radar 214A being adjusted or turned off. For example, if front radar or side radars of second vehicle 212 (not shown) may provide at least a portion of coverage 216A that is covered by corner radar 214A, radar data from the corner radars and/or side radars of second vehicle 212 can be fused so that a complete (e.g., stitched together) from multiple sensors can be provided for the period of time when corner radar 214A is turned off. In some examples, the data fused from multiple sensors can include data from a same type of sensor, such as radar data, or may include data from different types of sensors, such as radar data, lidar data, camera data, ultrasonic sensor data, time of flight sensor data, etc.

In some cases, radar interference controller 250 can assess a respective context of vehicles in the scene (e.g., first vehicle 202 and/or second vehicle 212) to determine any measures that may be taken to avoid or mitigate radar interference. The respective context can be associated with the operation of first vehicle 202 and/or second vehicle 212, a driving environment or circumstances of first vehicle 202 and/or second vehicle 212, a relationship between the operation of first vehicle 202 and/or second vehicle 212 and front radar 204 and corner radar 214A, kinematics in the scene (e.g., of first vehicle 202, second vehicle 212, pedestrian 230, and/or any other elements in the scene), scene elements (e.g., type of road, type of lane, number of lanes, number of roads, directionality of roads/lanes, intersection, cross-walk, traffic signs, objects in the scene, other pedestrians in the scene, other vehicles in the scene, etc.) in the scene, traffic rules associated with the scene, traffic conditions, weather conditions, environment conditions, etc.

For example, radar interference controller 250 can take into account road features/conditions (e.g., wet surface or icy surface on some portions of the road, etc.), or scene features (e.g., a weather condition, a lighting condition, type of road/lane, size/configuration of road/lane, directionality of road/lane, intersection, cross-walk, etc.) to determine whether radar information from a certain radar has or does not have a threshold impact on an operation (e.g., one a parameter associated with the operation, such as a safety parameter, a performance parameter, etc.) of first vehicle 202 and/or second vehicle 212 and/or whether that certain radar can be adjusted (e.g., turned off, powered down, etc.) for a period of time without increasing (or without a threshold increase of) a safety risk (and/or a safety parameter) associated with first vehicle 202 and/or second vehicle 212.

In some cases, radar interference controller 250 can adjust an operation of the radar(s) and/or modify one or more parameters of the radar(s) to avoid or mitigate radar interference. For example, based on the assessment of one or more factors as described above, radar interference controller 250 can adjust the operation (or modify the parameters) of front radar 204 and/or corner radar 214A. Non-limiting examples of radar parameters that can be modified can include a power supply, a transmit power level, a beam pattern (e.g., a beamforming parameter), a duty cycle, a modulation bandwidth, a time offset, a sensitivity, a modulation frequency, and so on.

For example, the systems and technique can deactivate/turn off (or send a signal to second vehicle 212 to deactivate) corner radar 214A for a certain period of time to avoid radar interference. In another example, radar interference controller 250 can control the power level of front radar 204 and/or corner radar 214A to reduce or avoid radar interference for a certain period of time. For example, the power level of front radar 204 can be increased and/or the power level of corner radar 214A can be lowered for a predetermined period of time. In another example, radar interference controller 250 can adjust a beamforming configuration or apply beamforming to reduce or avoid radar interference. For example, the beam pattern of the receiving antenna array of front radar 204 and/or corner radar 214A can be adjusted to reduce the power received from certain directions so that radar interference can be reduced or avoided.

In some approaches, radar interference controller 250 may predict radar interference (e.g., potential radar interference that may occur) between different radars based on an understanding of the scene from sensor data (e.g., radar data captured by front radar 204 and/or corner radar 214A, other type of sensor data, etc.). For example, radar interference controller 250 can identify vehicles (e.g., first vehicle 202 and second vehicle 212) that are approaching each other at a certain distance and a certain velocity and determine that front radar 204 of first vehicle 202 and corner radar 214A may be within a distance that might create radar interference. As follows, radar interference controller 250 can preemptively take (or prepare to take) measures to avoid or mitigate the potential radar interference.

Figure 3:
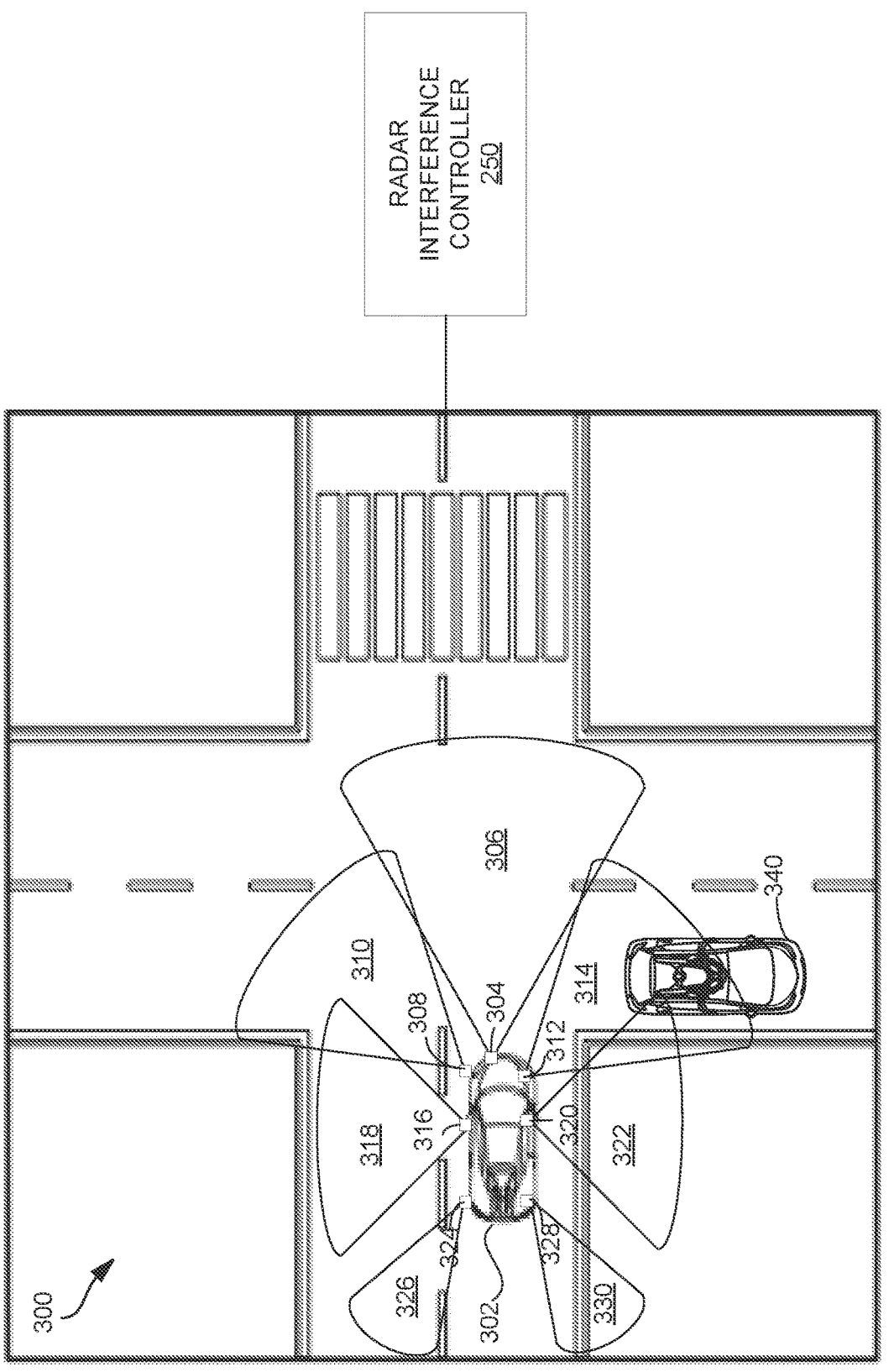
FIG. 3 illustrates a diagram illustrating an example environment in which intra-vehicle radar interference can be mitigated, according to some examples of the present disclosure.

FIG. 3 illustrates an example environment 300 in which intra-vehicle radar interference can be avoided or mitigated. As shown, vehicle 302 is fitted with multiple radar systems such as front radar 304 (with coverage 306), corner radars 308 and 312 (with coverage 310 and 314, respectively), side radars 316 and 320 (with coverage 318 and 322, respectively), and rear radars 324 and 328 (with coverage 326 and 330, respectively).

In some examples, radar interference controller 250 can identify or predict intra-vehicle radar interference based on radar data from at least one of the radars and/or sensor data obtained from various sensors of vehicle 302 such as a camera sensor, a LIDAR sensor, a radar sensor, an ultrasonic sensor, an infrared sensor, a GPS, an IMU, etc. For example, radar interference controller 250 can identify radar interference between corner radar 312 and side radar 320 on vehicle 302.

In some examples, radar interference controller 250 can, based on sensor data from one or more sensors of vehicle 302, evaluate various factors that are associated with the scene and vehicle 302 to determine which radar(s) or which portions of the scene captured by one or more radars may be relevant to an operation of vehicle 302 and/or may have an impact on a safety risk associated with vehicle 302 and/or a parameter associated with vehicle 302 (e.g., a safety parameter, a performance parameter, a scene understanding parameter, etc.). Such information can be used to determine whether vehicle 302 should or needs to (e.g., given the safety risk if any and/or the parameter associated with vehicle 302) collect data from a particular radar or can forego receiving data from a particular radar. For example, a safety parameter, a coverage parameter, and/or a respective context of vehicle 302 in the scene can be evaluated to determine which radar(s) or radar coverage may be relevant to the operation of vehicle 302 (and/or an impact on a safety risk and/or parameter of radar data having that radar coverage) and further determine which measures may be taken to avoid or mitigate radar interference.

To illustrate, radar interference controller 250 can assess the impact of radar data on the safety (e.g., on a safety metric/parameter) of vehicle 302. For example, radar interference controller 250 can determine which radar information or radar coverage (e.g., between corner radar 312 and side radar 320) is likely to have more impact on the safe operation (e.g., on a safety metric and/or safety risk) of vehicle 302. If vehicle 302 is planned to make a right turn, radar information on the area of coverage 314 and vehicle 340 may have more impact on the safe operation of vehicle 302 than other radar information such as radar information with coverage 326. On the other hand, if vehicle 302 is planned to drive straight, both radar information from radar 324 and radar 328 may have a lower impact (and/or less than a threshold impact) on the safe operation of vehicle 302.

Based on the assessment and prediction of the relevance of radar interference on vehicle 302, radar interference controller 250 can determine which measure is to be taken to reduce or avoid radar interference. For example, radar interference controller 250 can adjust modify the parameters of one or more radars of vehicle 302 (e.g., activating or deactivating radar(s), increasing or decreasing the power level of radar(s), applying beamforming to radar(s), etc.).

Figure 4:
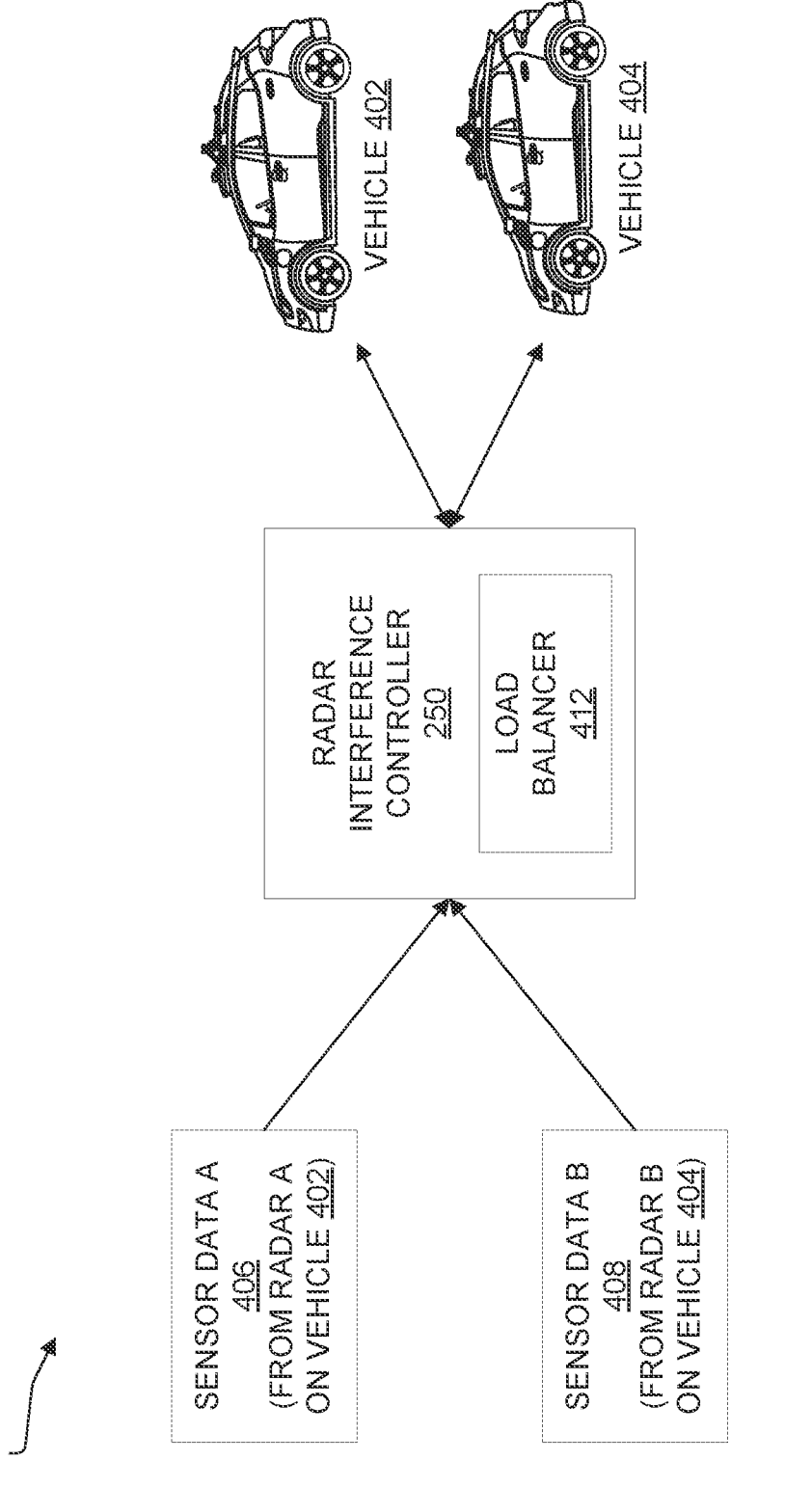
FIG. 4 illustrates a diagram illustrating an example system that can be used to mitigate radar interference between vehicular radar sensors, according to some examples of the present disclosure.

FIG. 4 illustrates a diagram illustrating an example system 400 that can be used to avoid or mitigate radar interference between vehicular radar sensors. In the illustrative example of FIG. 4, example system 400 includes radar interference controller 250 (e.g., a centralized device) that may communicate with radar systems (or vehicles that are equipped with radar systems such as vehicle 402 and vehicle 404) to adjust one or more radar parameters and/or instruct a vehicle(s) to adjust one or more radar parameters, in order to mitigate radar interference. The radar interference controller 250 can include or represent a cloud system or component, a server, a datacenter, a computing device, a processor (e.g., a central processing unit, a graphics processing unit, an application specific integrated circuit, a field-programmable gate array, a system on chip, and/or any other processing device).

As illustrated, radar interference controller 250 may receive sensor data A 406, which is collected by radar A on vehicle 402 and sensor data B 408, which is collected by radar B on vehicle 404. In addition to sensor data A 406 and sensor data B 408, radar interference controller 250 can receive other sensor data captured by other sensors (e.g., a camera sensor, a LIDAR sensor, a radar sensor, an ultrasonic sensor, an infrared sensor, a GPS, an IMU, etc.) mounted on vehicle 402 or vehicle 404. In some cases, radar interference controller 250 may receive data comprising outputs of perception stack (similar to perception stack 112), prediction stack (similar to prediction stack 116), or any other applicable stack of vehicle 402 and/or vehicle 404.

Based on sensor data A 406, sensor data B 408, other sensor data from one or more other sensors of vehicle 402 and vehicle 404 (optionally), outputs of perception, prediction, and/or other stacks of vehicle 402 and vehicle 404, or any combination thereof, radar interference controller 250 can identify radar interference between radars of vehicle 402 and/or vehicle 404 and determine how or whether to adjust an operation of any radar. The radar interference can be vehicle-to-vehicle radar interference (e.g., between vehicle 402 and vehicle 404) or intra-vehicle radar interference (e.g., within vehicle 402 or within vehicle 404). In some cases, radar interference controller 250 can implement one or more stacks similar to vehicle 402 or vehicle 404, such as a perception stack, a prediction stack, and/or any other stack. In such cases, the radar interference controller 250 can receive sensor data from vehicle 402 and/or vehicle 404 and use its own stack(s) to make predictions, perception determinations, planning determinations, etc., and/or replicate intelligence generated by stacks on vehicle 402 and/or vehicle 404. The radar interference controller 250 can use this information to identify radar interference between radars and determine how or whether to adjust an operation of any radar. In some cases, the radar interference controller 250 can implement one or more machine learning models to much any of such determinations, and/or can use one or more machine learning models to implement one or more stacks or portions thereof.

In some examples, radar interference controller 250 may identify one or more artifacts in sensor data A 406 and/or sensor data B 408, which represent signal noise resulting from radar interference. For example, radar interference caused by returns from radar B on vehicle 404 can make sensor data A 406 look like there is an object/artifact when there is not. As follows, radar interference controller 250 can determine radar interference based on detecting artifact(s) from various sensor data.

In some cases, when radar interference is identified, radar interference controller 250 may determine the source of radar interference. For example, radar interference controller 250 can determine that a number of detections within a predetermined size of an area exceeds a threshold number of detections, which may indicate a radar interference. As follows, radar interference controller 250 may determine the direction of those detections. In other words, radar interference controller 250 may determine which sensor may have made those detections based on the direction of the detections. In some cases, radar interference controller 250 can determine a type of the source/cause of the radar interference based on interference patterns. As previously described, the artifacts that appear as detections due to the radar interference may have a shape of blobs, rings, or lines in a top-down map view.

In some approaches, to determine a mitigation measure for radar interference (e.g., an adjustment to an operation of radars), radar interference controller 250 may evaluate various factors such as a safety parameter, a coverage parameter, a respective context of vehicle(s) in the scene, an operation of one or more vehicles in the scene (e.g., vehicle 402 and vehicle 404), kinematics in the scene, a planned operation of one or more vehicles in the scene, and so on. In doing so, radar interference controller 250 may use the information about the scene from various sensors (e.g., radar data, sensor data, outputs of perception and prediction stacks, etc.) to determine which radar data or which portion of the scene may be critical or relevant to an operation of vehicles 402 and 404.

In some cases, radar interference controller 250 may evaluate/predict the impact of radar data on the safety of vehicles 402 and 404. For example, radar interference controller 250 can determine the impact on the safety of vehicles 402 and 404 for having/not having sensor data A 406 or sensor data B 408 (or having incorrect information in sensor data A 406 or sensor data B 408) in the scene. For example, if there is an object in the lane that vehicle 402 is planning to merge, radar interference controller 250 may determine that sensor data A 406 from radar A on vehicle 402 has a high impact on the safety since not having information of a potential object in the lane may result in a collision.

In some approaches, radar interference controller 250 can evaluate the coverage of radar A associated with sensor data A 406 and radar B associated with sensor data B 408, which can help determine which radar is needed (and/or for which portion of the area in the scene radar data is needed) for an operation of vehicles 402 and 404. For example, a combined coverage of radar A and radar B includes the coverage of radar A without the coverage of radar B, radar interference controller 250 may determine that radar B can be turned off so that multiple sensors do not run at the same time to provide the same coverage so this way radar interference can be avoided.

In some cases, radar interference controller 250 can assess a respective context of vehicles in the scene to determine the measures that may be taken to mitigate radar interference. The respective context can be associated with the operation of vehicles 402 and 404, a driving environment of vehicles 402 and 404 road features/conditions (e.g., wet surface or icy surface on some portions of the road, etc.), or scene features (e.g., a weather condition, a lighting condition, etc.), a relationship between the operation of vehicles 402 and 404 and radar A and radar B.

In some approaches, based on the assessment/prediction of various factors as described, radar interference controller 250 may determine which radar sensor's operation (or which radar parameter) needs to be adjusted to mitigate radar interference. In doing so, radar interference controller 250 can balance those factors (e.g., a safety parameter, a coverage parameter, a respective context, etc.) along with the degree of intensity of radar interference and calculate an overall score. For example, if radar interference is high (e.g., is above a threshold) and the safety score is low (e.g., below a threshold), the overall score for the respective radar might be lower than the one where the safety score is low, but radar interference is low.

In some cases, radar interference controller 250 can weigh each factor in calculating the overall score so that the factors contribute differently to the overall score. For example, each factor can include weights or biases based on the importance of the factor in the scene and/or operation of the vehicles. If a safety parameter has a higher importance in the scene (e.g., due to a potential collision or safety critical event), a higher weight such as 0.8 (e.g., meaning 80%) can be assigned to the safety parameter in determining the overall score. If a coverage parameter has a lower importance in the scene (e.g., when a radar coverage from a radar that is causing radar interference is fully or nearly fully covered by another radar), a lower weight such as 0.05 (e.g., meaning 5%) can be assigned to the coverage parameter in determining the overall score.

A number of radar adjustments can be available to avoid or mitigate radar interference. For example, radar interference controller 250 can modify one or more parameters of radar(s) such as a power supply, a transmit power level, a beam pattern (e.g., a beamforming parameter), a duty cycle, a modulation bandwidth, a time offset, a sensitivity, a modulation frequency, and so on. In some examples, radar interference controller 250 may send a signal to vehicle 402 and/or vehicle 404 to activate or deactivate radar A or radar B. In some aspects, radar interference controller 250 may send a signal to vehicle 402 and/or vehicle 404 to control the power level of radar A and/or radar B (e.g., to increase, decrease, or keep it at the same level). In some approaches, radar interference controller 250 may send a signal to vehicle 402 and/or vehicle 404 to adjust a beamforming parameter associated with radar A and/or radar B.

In some aspects, radar interference controller 250 may include load balancer 412, which is configured to determine a time interval or a period of time for which the adjustment of operation of radar(s) is to be performed, and/or orchestrate radar operations and/or adjustments. For example, load balancer 412 can predict the amount of time that is needed (e.g., time intervals) to avoid radar interference when a certain radar is deactivated or when the radar can be re-activated. As follows, based on the assessment of load balancer 412, radar interference controller 250 may send an instruction to adjust the operation of radar A and/or radar B during one or more time intervals as determined by load balancer 412. In other words, based on assessments and predictions of load balancer 412, radar interference controller 250 can schedule the adjustment of the operation of radar A and/radar B accordingly.

In some cases, the assessment and/or prediction of various factors as described above can be done via a machine learning model. For example, a machine learning model can, based on sensor data A 406 from radar A on vehicle 402 and sensor data B 408 from radar B on vehicle 404, assess the impact of each sensor data on the safety of vehicles 402 and 404. In some examples, a machine learning model can evaluate the factors as a whole and output an overall score, which can be used to make an operational decision for mitigating radar interference.

In some approaches, radar interference controller 250 may predict radar interference (e.g., potential radar interference that may occur in the near future) based on the understanding of the scene from sensor data A 406, sensor data B 408, and/or any other available sensor data collected by various sensors of vehicles 402 and 404. For example, radar interference controller 250 can determine a distance between vehicle 402 and vehicle 404, velocities, poses and/or trajectories of vehicles 402 and 404 at a given time (e.g., $t_0$) and further determine that radar A on vehicle 402 and radar B on vehicle 404 may be within a distance that might create radar interference at a future time (e.g., $t_0+a$). As follows, radar interference controller 250 may preemptively take (or prepare to take) a measure to mitigate the potential radar interference.

FIG. 5 is a flowchart illustrating an example process 500 for mitigating radar interference between vehicular radar sensors. Although the example process 500 depicts a particular sequence of operations, the sequence may be altered without departing from the scope of the present disclosure. For example, some of the operations depicted may be performed in parallel or in a different sequence that does not materially affect the function of process 500. In other examples, different components of an example device or system that implements process 500 may perform functions at substantially the same time or in a specific sequence.

At block 510, process 500 includes receiving a first signal associated with a first RADAR sensor. For example, radar interference controller 250 as illustrated in FIGS. 2-4 may receive sensor data A 406, which includes a first signal associated with radar A on vehicle 402 (or sensor data from front radar 204 that has coverage 206 in the example environment 200).

At block 520, process 500 includes receiving a second signal associated with a second RADAR sensor. For example, radar interference controller 250 may receive sensor data B 408, which includes a second signal associated with radar B on vehicle 404 (or sensor data from corner radar 214A that has coverage 216A in the example environment 200).

In some examples, the first RADAR sensor is placed on a first vehicle of the one or more vehicles and the second RADAR sensor is placed on a second vehicle of the one or more vehicle. In other words, two radar sensors (e.g., front radar 204 and corner radar 214A) mounted on different vehicles (e.g., first vehicle 202 and second vehicle 212) can cause the vehicle-to-vehicle radar interference in the scene. In other examples, two radar sensors that are causing the radar interference may be placed on the same vehicle. For example, corner radar 312 and side radar 320 are mounted on the same vehicle 302 may cause intra-vehicle radar interference in example environment 300 of FIG. 3.

At block 530, process 500 includes determining an interference between the first signal associated with the first RADAR sensor and the second signal associated with the second RADAR sensor. For example, radar interference controller 250 can determine radar interference between front radar 204 of first vehicle 202 and corner radar 214A of second vehicle 212 based on radar data from front radar 204 and corner radar 214A and/or sensor data captured by various sensors of first vehicle 202 and/or second vehicle 212.

In some examples, determining the interference between the first signal and the second signal can include determining one or more artifacts in sensor data associated with at least one of the first signal and the second signal. For example, radar interference controller 250 may identify pedestrian 230 that appears in radar data from front radar 204 of first vehicle 202 and does not appear in radar data from corner radar 214A of second vehicle 212, which may indicate radar interference between front radar 204 of first vehicle 202 and corner radar 214A of second vehicle 212.

At block 540, process 500 includes determining one or more adjustments to an operation of at least one of the first RADAR sensor and the second RADAR sensor. The process 500 can determine the one or more adjustments in response to determining the interference between the first signal and the second signal. In some examples, the process 500 can determine the one or more adjustments based on at least one of a safety parameter, a coverage parameter, and a respective context of one or more vehicles associated with at least one of the first RADAR sensor and the second RADAR sensor. For example, radar interference controller 250 may evaluate a safety parameter (e.g., the estimated impact of radar data from front radar 204 or corner radar 214A), a coverage parameter (e.g., an overlap in coverage of front radar 204 and corner radar 214A given respective poses of front radar 204 and corner radar 214A), and/or a respective context (e.g., operation of first vehicle 202 and/or second vehicle 212, a driving environment of first vehicle 202 and/or second vehicle 212, a relationship between the operation of first vehicle 202 and/or second vehicle 212 and the front radar 204 and corner radar 214A, etc.) to determine one or more adjustments to the operation of front radar 204 and/or corner radar 214A.

At block 550, process 500 includes transmitting one or more instructions to adjust an operation of at least one of the first RADAR sensor and the second RADAR sensor during one or more time intervals. For example, radar interference controller 250 may transmit to first vehicle 202 an instruction to adjust an operation of front radar 204, transmit to second vehicle 212 an instruction to adjust an operation of corner radar 214A, transmit to first vehicle 202 an instruction to modify radar parameters of front radar 204, and/or transmit to first vehicle 212 an instruction to modify radar parameters of corner radar 214A.

For example, radar interference controller 250 may send a signal to first vehicle 202 and/or second vehicle 212 to activate or deactivate front radar 204 and/or corner radar 214A. In another example, radar interference controller 250 may send a signal to first vehicle 202 and/or second vehicle 212 to control the power level of front radar 204 and/or corner radar 214A (e.g., increase, decrease, or keep at the same level of the power level of front radar 204 and/or corner radar 214A). In another example, radar interference controller 250 may send a signal to first vehicle 202 and/or second vehicle 212 to adjust a beamforming parameter of front radar 204 and/or corner radar 214A (e.g., adjusting the beam pattern).

Figure 6:
FIG. 6 is a diagram illustrating an example configuration of a neural network model that can be used to implement a radar interference controller, according to some examples of the present disclosure.

FIG. 6 illustrates an example neural network 608 that can be used to implement all or a portion of the systems and techniques described herein (e.g., neural network 600 can be used to implement radar interference controller 250). The example neural network 600 is merely one illustrative example provided for clarity and explanation purposes. One of ordinary skill in the art will recognize that other configurations of a neural network are also possible and contemplated herein.

An input layer 620 can be configured to receive sensor data and/or data relating to an environment surrounding an AV. Neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. Neural network 600 further includes an output layer 621 that provides an output resulting from the processing performed by the hidden layers 622a, 622b, through 622n.

Neural network 600 is a multi-layer neural network of interconnected nodes. Each node can represent a piece of information. Information associated with the nodes is shared among the different layers and each layer retains information as information is processed. In some cases, the neural network 600 can include a feed-forward network, in which case there are no feedback connections where outputs of the network are fed back into itself. In some cases, the neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the first hidden layer 622a can transform the information of each input node by applying activation functions to the input node information. The information derived from the transformation can then be passed to and can activate the nodes of the next hidden layer 622b, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 621, at which an output is provided. In some cases, while nodes in the neural network 600 are shown as having multiple output lines, a node can have a single output and all lines shown as being output from a node represent the same output value.

In some cases, each node or interconnection between nodes can have a weight that is a set of parameters derived from the training of the neural network 600. Once the neural network 600 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 600 to be adaptive to inputs and able to learn as more and more data is processed.

The neural network 600 is pre-trained to process the features from the data in the input layer 620 using the different hidden layers 622a, 622b, through 622n in order to provide the output through the output layer 621.

In some cases, the neural network 600 can adjust the weights of the nodes using a training process called backpropagation. A backpropagation process can include a forward pass, a loss function, a backward pass, and a weight update. The forward pass, loss function, backward pass, and parameter/weight update is performed for one training iteration. The process can be repeated for a certain number of iterations for each set of training data until the neural network 600 is trained well enough so that the weights of the layers are accurately tuned.

To perform training, a loss function can be used to analyze error in the output. Any suitable loss function definition can be used, such as a Cross-Entropy loss. Another example of a loss function includes the mean squared error (MSE), defined as $E\_total = \Sigma(\frac{1}{2} (target-output)^2)$. The loss can be set to be equal to the value of E_total.

The loss (or error) will be high for the initial training data since the actual values will be much different than the predicted output. The goal of training is to minimize the amount of loss so that the predicted output is the same as the training output. The neural network 600 can perform a backward pass by determining which inputs (weights) most contributed to the loss of the network, and can adjust the weights so that the loss decreases and is eventually minimized.

The neural network 600 can include any suitable deep network. One example includes a Convolutional Neural Network (CNN), which includes an input layer and an output layer, with multiple hidden layers between the input and out layers. The hidden layers of a CNN include a series of convolutional, nonlinear, pooling (for downsampling), and fully connected layers. The neural network 600 can include any other deep network other than a CNN, such as an autoencoder, Deep Belief Nets (DBNs), Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; RNNs; CNNs; deep learning; Bayesian symbolic methods; Generative Adversarial Networks (GANs); support vector machines; image registration methods; and applicable rule-based systems. Where regression algorithms are used, they may include but are not limited to: a Stochastic Gradient Descent Regressor, a Passive Aggressive Regressor, etc.

Machine learning classification models can also be based on clustering algorithms (e.g., a Mini-batch K-means clustering algorithm), a recommendation algorithm (e.g., a Min-wise Hashing algorithm, or Euclidean Locality-Sensitive Hashing (LSH) algorithm), and/or an anomaly detection algorithm, such as a local outlier factor. Additionally, machine-learning models can employ a dimensionality reduction approach, such as, one or more of: a Mini-batch Dictionary Learning algorithm, an incremental Principal Component Analysis (PCA) algorithm, a Latent Dirichlet Allocation algorithm, and/or a Mini-batch K-means algorithm, etc.

Figure 7:
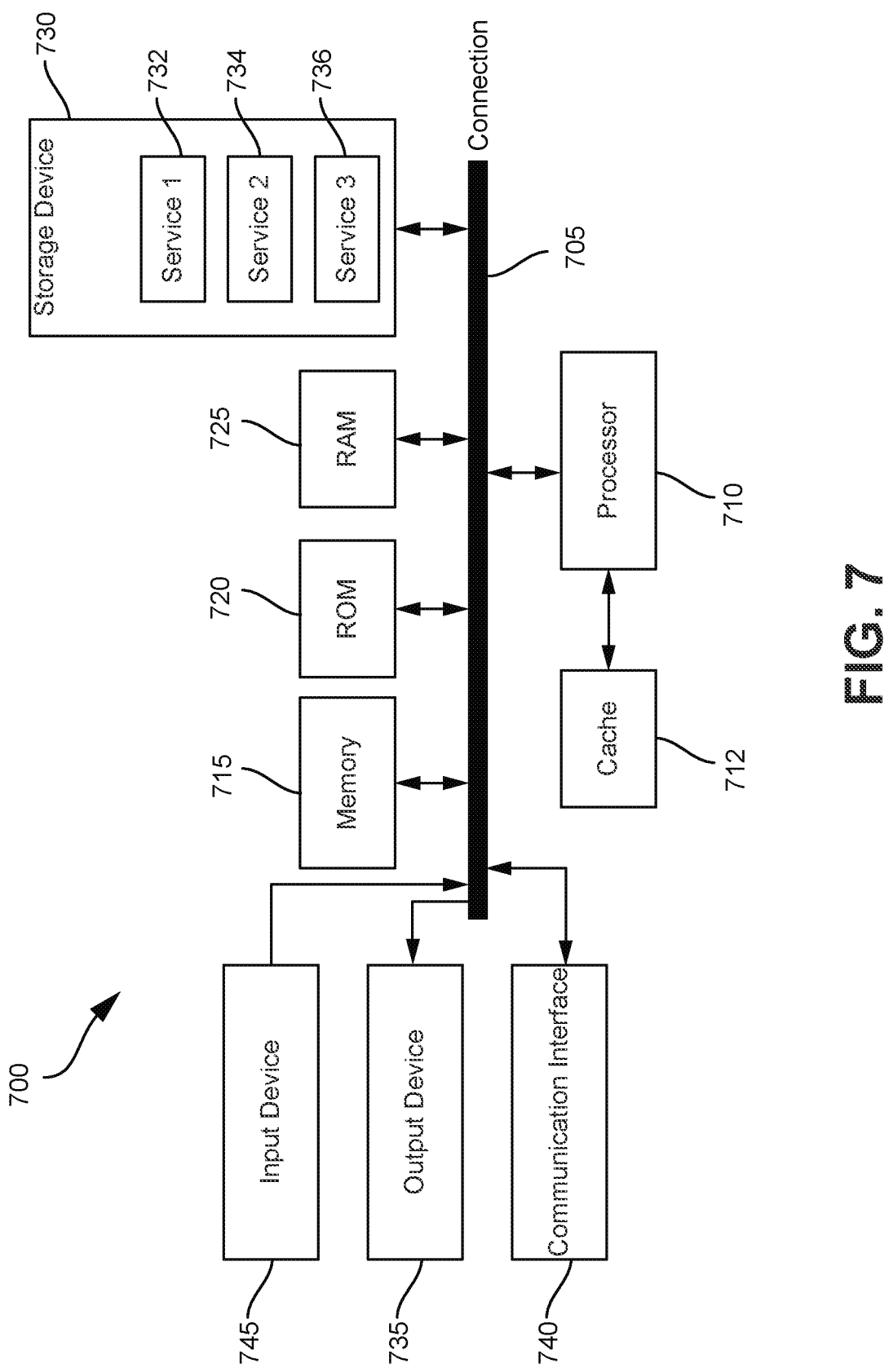
FIG. 7 illustrates an example processor-based system with which some aspects of the subject technology can be implemented.

FIG. 7 illustrates an example processor-based system with which some aspects of the subject technology can be implemented. For example, processor-based system 700 can be any computing device making up local computing device 110, client computing device 170, a passenger device executing the ride-hailing application 172, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some examples, one or more of the described system components represents many such components each performing some or all of the function for which the component is described. In some examples, the components can be physical or virtual devices.

Example system 700 includes at least one processing unit (Central Processing Unit (CPU) or processor) 710 and connection 705 that couples various system components including system memory 715, such as Read-Only Memory (ROM) 720 and Random-Access Memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communication interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Atatic RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L#), Resistive RAM (RRAM/ReRAM), Phase Change Memory (PCM), Spin Transfer Torque RAM (STT-RAM), another memory chip or cartridge, and/or a combination thereof.

Storage device 730 can include software services, servers, services, etc., that when the code that defines such software is executed by the processor 710, it causes the system 700 to perform a function. In some examples, a hardware service that performs a particular function can include the software component stored in a computer-readable medium in connection with the necessary hardware components, such as processor 710, connection 705, output device 735, etc., to carry out the function.

Examples within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Examples may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative Examples of the Disclosure Include

Aspect 1. A system comprising: a memory; and one or more processors coupled to the memory, the one or more processors being configured to: receive a first signal associated with a first radio detection and ranging (RADAR) sensor; receive a second signal associated with a second RADAR sensor; determine an interference between the first signal associated with the first RADAR sensor and the second signal associated with the second RADAR sensor; in response to determining the interference, determine one or more adjustments to an operation of at least one of the first RADAR sensor and the second RADAR sensor based on at least one of a safety parameter, a coverage parameter, and a respective context of one or more vehicles associated with at least one of the first RADAR sensor and the second RADAR sensor; and transmit one or more instructions to adjust the operation of at least one of the first RADAR sensor and the second RADAR sensor during one or more time intervals.

Aspect 2. The system of Aspect 1, wherein determining the interference between the first signal associated with the first RADAR sensor and the second signal associated with the second RADAR sensor includes: determining one or more artifacts in sensor data associated with at least one of the first signal and the second signal.

Aspect 3. The system of Aspect 1 or 2, wherein the safety parameter includes a parameter defining an estimated impact of data from the first and second RADAR sensors on a safety metric of the one or more vehicles.

Aspect 4. The system of any of Aspects 1 to 3, wherein the coverage parameter includes a parameter determining an overlap in coverage of the first and second RADAR sensors given respective poses of the first and second RADAR sensors at the one or more time intervals.

Aspect 5. The system of any of Aspects 1 to 4, wherein a combined coverage of the first and second RADAR sensors at the one or more time intervals after adjusting the operation of at least one of the first RADAR sensor and the second RADAR sensor includes a coverage of the first RADAR sensor without a coverage of the second RADAR sensor.

Aspect 6. The system of any of Aspects 1 to 5, wherein the respective context is associated with at least one of an operation of the one or more vehicles, a driving environment of the one or more vehicles, and a relationship between the operation of the one or more vehicles and the first and second RADAR sensors.

Aspect 7. The system of any of Aspects 1 to 6, wherein adjusting the operation of at least one of the first RADAR sensor and the second RADAR sensor during the one or more time intervals comprises: activating the first RADAR sensor during the one or more time intervals; changing a power level of the second RADAR sensor during the one or more time intervals; and adjusting a beamforming parameter of the first and second RADAR sensors during the one or more time intervals.

Aspect 8. The system of any of Aspects 1 to 7, wherein the first RADAR sensor is on a first vehicle of the one or more vehicles and the second RADAR sensor is on a second vehicle of the one or more vehicles.

Aspect 9. The system of Aspect 8, wherein adjusting the operation of at least one of the first RADAR sensor and the second RADAR sensor during the one or more time intervals comprises coordinating or scheduling usage of the first RADAR sensor and the second RADAR sensor between the first vehicle and the second vehicle, wherein one of the first RADAR sensor or the second RADAR sensor is scheduled for use at the one or more time intervals and a different one of the first RADAR sensor or the second RADAR sensor is scheduled for use at one or more different time intervals.

Aspect 10. A method comprising: receiving a first signal associated with a first radio detection and ranging (RADAR) sensor; receiving a second signal associated with a second RADAR sensor; determining an interference between the first signal associated with the first RADAR sensor and the second signal associated with the second RADAR sensor; in response to determining the interference, determining one or more adjustments to an operation of at least one of the first RADAR sensor and the second RADAR sensor based on at least one of a safety parameter, a coverage parameter, and a respective context of one or more vehicles associated with at least one of the first RADAR sensor and the second RADAR sensor; and transmitting one or more instructions to adjust the operation of at least one of the first RADAR sensor and the second RADAR sensor during one or more time intervals.

Aspect 11. The method of Aspect 10, wherein determining the interference between the first signal associated with the first RADAR sensor and the second signal associated with the second RADAR sensor includes: determining one or more artifacts in sensor data associated with at least one of the first signal and the second signal.

Aspect 12. The method of Aspect 10 or 11, wherein the safety parameter includes a parameter defining an estimated impact of data from the first and second RADAR sensors on a safety metric of the one or more vehicles.

Aspect 13. The method of any of Aspects 10 to 12, wherein the coverage parameter includes a parameter determining an overlap in coverage of the first and second RADAR sensors given respective poses of the first and second RADAR sensors at the one or more time intervals.

Aspect 14. The method of any of Aspects 10 to 13, wherein a combined coverage of the first and second RADAR sensors at the one or more time intervals after adjusting the operation of at least one of the first RADAR sensor and the second RADAR sensor includes a coverage of the first RADAR sensor without a coverage of the second RADAR sensor.

Aspect 15. The method of any of Aspects 10 to 14, wherein the respective context is associated with at least one of an operation of the one or more vehicles, a driving environment of the one or more vehicles, and a relationship between the operation of the one or more vehicles and the first and second RADAR sensors.

Aspect 16. The method of any of Aspects 10 to 12, wherein adjusting the operation of at least one of the first RADAR sensor and the second RADAR sensor during the one or more time intervals comprises: activating the first sensor during the one or more time intervals; changing a power level of the second RADAR sensor during the one or more time intervals; and adjusting a beamforming parameter of the first and second RADAR sensors during the one or more time intervals.

Aspect 17. The method of any of Aspects 10 to 16, wherein the first RADAR sensor is on a first vehicle of the one or more vehicles and the second RADAR sensor is on a second vehicle of the one or more vehicles.

Aspect 18. The method of Aspect 17, adjusting the operation of at least one of the first RADAR sensor and the second RADAR sensor during the one or more time intervals comprises coordinating or scheduling usage of the first RADAR sensor and the second RADAR sensor between the first vehicle and the second vehicle, wherein one of the first RADAR sensor or the second RADAR sensor is scheduled for use at the one or more time intervals and a different one of the first RADAR sensor or the second RADAR sensor is scheduled for use at one or more different time intervals.

Aspect 19. A non-transitory computer-readable medium having stored thereon instructions which, when executed by one or more processors, cause the one or more processors to: receive a first signal associated with a first radio detection and ranging (RADAR) sensor; receive a second signal associated with a second RADAR sensor; determine an interference between the first signal associated with the first RADAR sensor and the second signal associated with the second RADAR sensor; in response to determining the interference, determine one or more adjustments to an operation of at least one of the first RADAR sensor and the second RADAR sensor based on at least one of a safety parameter, a coverage parameter, and a respective context of one or more vehicles associated with at least one of the first RADAR sensor and the second RADAR sensor; and transmit one or more instructions to adjust the operation of at least one of the first RADAR sensor and the second RADAR sensor during one or more time intervals.

Aspect 20. The non-transitory computer-readable medium of Aspect 19, wherein determining the interference between the first signal associated with the first RADAR sensor and the second signal associated with the second RADAR sensor includes: determining one or more artifacts in sensor data associated with at least one of the first signal and the second signal.

What is claimed is:

1. A system comprising:
a memory; and
one or more processors coupled to the memory, the one or more processors being configured to:
receive a first signal associated with a first radio detection and ranging (RADAR) sensor;
receive a second signal associated with a second RADAR sensor;
determine an interference between the first signal associated with the first RADAR sensor and the second signal associated with the second RADAR sensor;
determine one or more time intervals during which adjustments to an operation of at least one of the first RADAR sensor and the second RADAR sensor are to be applied;

in response to determining the interference, determine one or more adjustments to an operation of the first RADAR sensor and the second RADAR sensor based on a safety parameter, and a coverage parameter, the coverage parameter determining, for each of the one or more time intervals, an overlap in coverage of the first RADAR sensor and the second RADAR sensor given respective poses of the first RADAR sensor and the second RADAR sensor; and
transmit one or more instructions to adjust the operation of at least one of the first RADAR sensor and the second RADAR sensor during the one or more time intervals, wherein the one or more instructions prevent simultaneous transmissions by the first RADAR sensor and the second RADAR sensor during the one or more time intervals in which the overlap determined by the coverage parameter exceeds a threshold value.

2. The system of claim 1, wherein determining the interference between the first signal associated with the first RADAR sensor and the second signal associated with the second RADAR sensor includes:
determining one or more artifacts in sensor data associated with at least one of the first signal and the second signal.

3. The system of claim 1, wherein the safety parameter includes a parameter defining an estimated impact of data from the first and second RADAR sensors on a safety metric of one or more vehicles.

4. The system of claim 1, wherein the coverage parameter includes, for each of the one or more time intervals, a quantitative measure of the overlap in coverage of the first RADAR sensor and the second RADAR sensor, the quantitative measure being computed as a solid-angle measure of an intersection between a first coverage region of the first RADAR sensor and a second coverage region of the second RADAR sensor, the first coverage region of the first RADAR sensor and the second coverage region of the second RADAR sensor being determined from respective poses of the first RADAR sensor and the second RADAR sensor and from one or more beamforming parameters at a corresponding one of the one or more time intervals, and wherein the quantitative measure is compared to a predetermined threshold to schedule a mitigation action comprising at least one of a sensor deactivation or a sensor parameter adjustment to reduce the interference.

5. The system of claim 1, wherein a combined coverage of the first and second RADAR sensors at the one or more time intervals after adjusting the operation of at least one of the first RADAR sensor and the second RADAR sensor includes a coverage of the first RADAR sensor without a coverage of the second RADAR sensor.

6. The system of claim 1, wherein determining the one or more adjustments to the operation of at least one of the first RADAR sensor and the second RADAR sensor is further based on a respective context of one or more vehicles associated with at least one of the first RADAR sensor and the second RADAR sensor, and wherein the respective context is associated with at least one of an operation of the one or more vehicles, a driving environment of the one or more vehicles, and a relationship between the operation of the one or more vehicles and the first RADAR sensor and the second RADAR sensor.

7. The system of claim 1, wherein adjusting the operation of at least one of the first RADAR sensor and the second RADAR sensor during the one or more time intervals comprises:

activating the first RADAR sensor during the one or more time intervals;

changing a power level of the second RADAR sensor during the one or more time intervals; and adjusting a beamforming parameter of at least one of the first RADAR sensor and the second RADAR sensor in accordance with the transmitted one or more instructions for the one or more time intervals.

8. The system of claim 1, wherein the first RADAR sensor is on a first vehicle and the second RADAR sensor is on a second vehicle.

9. The system of claim 8, wherein adjusting the operation of at least one of the first RADAR sensor and the second RADAR sensor during the one or more time intervals comprises coordinating or scheduling usage of the first RADAR sensor and the second RADAR sensor between the first vehicle and the second vehicle, wherein one of the first RADAR sensor or the second RADAR sensor is scheduled for use at the one or more time intervals and a different one of the first RADAR sensor or the second RADAR sensor is scheduled for use at one or more different time intervals, and wherein the coordinating or scheduling comprises transmitting a vehicle-to-vehicle control message that encodes a schedule determined from the safety parameter and the coverage parameter so that only one of the first RADAR sensor and the second RADAR sensor transmits during time intervals in which the overlap determined by the coverage parameter exceeds a threshold value.

10. A method comprising:

receiving a first signal associated with a first radio detection and ranging (RADAR) sensor;

receiving a second signal associated with a second RADAR sensor;

determining an interference between the first signal associated with the first RADAR sensor and the second signal associated with the second RADAR sensor;

determining one or more time intervals during which adjustments to an operation of at least one of the first RADAR sensor and the second RADAR sensor are to be applied;

in response to determining the interference, determining one or more adjustments to an operation of at least one of the first RADAR sensor and the second RADAR sensor based on a safety parameter and a coverage parameter, the coverage parameter determining, for each of the one or more time intervals, an overlap in coverage of the first RADAR sensor and the second RADAR sensor given respective poses of the first RADAR sensor and the second RADAR sensor; and transmitting one or more instructions to adjust the operation of at least one of the first RADAR sensor and the second RADAR sensor during the one or more time intervals, wherein the one or more instructions prevent simultaneous transmissions by the first RADAR sensor and the second RADAR sensor during the one or more time intervals in which the overlap determined by the coverage parameter exceeds a threshold value.

11. The method of claim 10, wherein determining the interference between the first signal associated with the first RADAR sensor and the second signal associated with the second RADAR sensor includes:

determining one or more artifacts in sensor data associated with at least one of the first signal and the second signal.

12. The method of claim 10, wherein the safety parameter includes a parameter defining an estimated impact of data from the first and second RADAR sensors on a safety metric of one or more vehicles.

13. The method of claim 10, wherein the coverage parameter includes, for each of the one or more time intervals, a quantitative measure of the overlap in coverage of the first RADAR sensor and the second RADAR sensor, the quantitative measure computed as a solid-angle measure of an intersection between a first coverage region of the first RADAR sensor and a second coverage region of the second RADAR sensor, the first coverage region of the first RADAR sensor and the second coverage region of the second RADAR sensor being determined from respective poses of the first RADAR sensor and the second RADAR sensor and from one or more beamforming parameters at a corresponding one of the one or more time intervals, and wherein the quantitative measure is compared to a predetermined threshold to schedule a mitigation action comprising at least one of a sensor deactivation or a sensor parameter adjustment to reduce the interference.

14. The method of claim 10, wherein a combined coverage of the first and second RADAR sensors at the one or more time intervals after adjusting the operation of at least one of the first RADAR sensor and the second RADAR sensor includes a coverage of the first RADAR sensor without a coverage of the second RADAR sensor.

15. The method of claim 10, wherein determining the one or more adjustments to the operation of at least one of the first RADAR sensor and the second RADAR sensor is further based on a respective context of one or more vehicles associated with at least one of the first RADAR sensor and the second RADAR sensor, and wherein the respective context is associated with at least one of an operation of the one or more vehicles, a driving environment of the one or more vehicles, and a relationship between the operation of the one or more vehicles and the first RADAR sensor and the second RADAR sensor.

16. The method of claim 10, wherein adjusting the operation of at least one of the first RADAR sensor and the second RADAR sensor during the one or more time intervals comprises:

activating the first sensor during the one or more time intervals;

changing a power level of the second RADAR sensor during the one or more time intervals; and adjusting a beamforming parameter of at least one of the first RADAR sensor and the second RADAR sensor in accordance with the transmitted one or more instructions for the one or more time intervals.

17. The method of claim 10, wherein the first RADAR sensor is on a first vehicle and the second RADAR sensor is on a second vehicle.

18. The method of claim 17, wherein adjusting the operation of at least one of the first RADAR sensor and the second RADAR sensor during the one or more time intervals comprises coordinating or scheduling usage of the first RADAR sensor and the second RADAR sensor between the first vehicle and the second vehicle, wherein one of the first RADAR sensor or the second RADAR sensor is scheduled for use at the one or more time intervals and a different one of the first RADAR sensor or the second RADAR sensor is scheduled for use at one or more different time intervals, and wherein the coordinating or scheduling comprises transmitting a vehicle-to-vehicle control message that encodes a schedule determined from the safety parameter and the coverage parameter so that only one of the first RADAR sensor and the second RADAR sensor transmits during time intervals in which the overlap determined by the coverage parameter exceeds a threshold value.

19. A non-transitory computer-readable medium having stored thereon instructions which, when executed by one or more processors, cause the one or more processors to:

receive a first signal associated with a first radio detection and ranging (RADAR)

sensor; receive a second signal associated with a second RADAR sensor;

determine an interference between the first signal associated with the first RADAR sensor and the second signal associated with the second RADAR sensor;

determine one or more time intervals during which adjustments to an operation of at least one of the first RADAR sensor and the second RADAR sensor are to be applied;

in response to determining the interference, determine one or more adjustments to an operation of at least one of the first RADAR sensor and the second RADAR sensor based on a safety parameter, and a coverage parameter, the coverage parameter determining, for each of the one or more time intervals, an overlap in coverage of the first RADAR sensor and the second RADAR sensor given respective poses of the first RADAR sensor and the second RADAR sensor; and transmit one or more instructions to adjust the operation of at least one of the first RADAR sensor and the second RADAR sensor during one or more time intervals, wherein the one or more instructions prevent simultaneous transmissions by the first RADAR sensor and the second RADAR sensor during the one or more time intervals in which the overlap determined by the coverage parameter exceeds a threshold value.

20. The non-transitory computer-readable medium of claim 19, wherein determining the interference between the first signal associated with the first RADAR sensor and the second signal associated with the second RADAR sensor includes:

determining one or more artifacts in sensor data associated with at least one of the first signal and the second signal.

\* \* \* \* \*